(12) United States Patent
Chawla et al.

(10) Patent No.: US 7,137,143 B2
(45) Date of Patent: Nov. 14, 2006

(54) METHOD AND SYSTEM FOR CACHING SECURE WEB CONTENT

(75) Inventors: Rajeev Chawla, Union City, CA (US); Panagiotis Tsirigotis, Sunnyvale, CA (US); Dan Boneh, Palo Alto, CA (US)

(73) Assignee: Ingrian Systems Inc., Redwood City, CA (US)

( * ) Notice: Subject to any disclaimer, the term of this patent is extended or adjusted under 35 U.S.C. 154(b) by 5 days.

(21) Appl. No.: 09/901,350

(22) Filed: Jul. 9, 2001

(65) Prior Publication Data

US 2002/0016911 A1 Feb. 7, 2002

Related U.S. Application Data

(60) Provisional application No. 60/223,171, filed on Aug. 7, 2000.

(51) Int. Cl.
  G06F 17/00 (2006.01)
  G06F 15/16 (2006.01)
  H04L 9/00 (2006.01)

(52) U.S. Cl. .................. 726/12; 713/150; 713/153; 709/217; 709/219

(58) Field of Classification Search ................ 713/201; 380/277; 711/163; 705/50, 64, 80
See application file for complete search history.

(56) References Cited

U.S. PATENT DOCUMENTS

| | | | |
|---|---|---|---|
| 4,386,416 A | 5/1983 | Giltner | |
| 4,964,164 A | 10/1990 | Fiat | |
| 5,222,133 A | 6/1993 | Chou et al. | |
| 5,557,712 A | 9/1996 | Guay | |
| 5,734,744 A | 3/1998 | Wittenstein | |
| 5,764,235 A | 6/1998 | Hunt et al. | |
| 5,828,832 A | 10/1998 | Holden et al. | |
| 5,848,159 A | 12/1998 | Collins et al. | |
| 5,923,756 A | 7/1999 | Shambroom | |
| 6,021,198 A | 2/2000 | Anigbogu | |
| 6,061,448 A | 5/2000 | Smith et al. | |

(Continued)

FOREIGN PATENT DOCUMENTS

WO   WO 01/03398   1/2001

(Continued)

OTHER PUBLICATIONS

Netscape Proxy Server Administrator's Guide, Version 3.5 for Unix, Chapter 7, Chapter 9.*

(Continued)

*Primary Examiner*—Kim Vu
*Assistant Examiner*—Ponnoreay Pich
(74) *Attorney, Agent, or Firm*—Perkins Coie LLP

(57) ABSTRACT

A method and system for securing network communications are provided. In a network a Secure Reverse Proxy ("SRP") is placed among a server and a client where the client and SRP establish a secure connection using TLS protocol. Upon receiving a request from the client for a secure HTTP page, the SRP determines if the secure page is maintained in its cache. If the page is present, the SRP responds to the client by sending the requested secure HTTP page without contacting the server. If the page is not contained within the SRP's cache, the SRP establishes secure TLS connection with the server and forwards the request for the HTTP page. Receiving the HTTP page from the server, the SRP places it in its cache for future use. Having the page in its cache the SRP retrieves the page, encrypts it, and sends it to the requesting client. Subsequent requests for the same page do not involve the server enhancing the efficiency of network operations.

23 Claims, 2 Drawing Sheets

U.S. PATENT DOCUMENTS

| | | | |
|---|---|---|---|
| 6,073,242 A | 6/2000 | Hardy et al. | |
| 6,081,598 A | 6/2000 | Dai | |
| 6,081,900 A * | 6/2000 | Subramaniam et al. | 713/201 |
| 6,094,485 A | 7/2000 | Weinstein et al. | |
| 6,098,096 A | 8/2000 | Tsirigotis et al. | |
| 6,105,012 A | 8/2000 | Chang et al. | |
| 6,154,542 A | 11/2000 | Crandall | |
| 6,202,157 B1 | 3/2001 | Brownlie et al. | |
| 6,216,212 B1 * | 4/2001 | Challenger et al. | 711/163 |
| 6,233,565 B1 | 5/2001 | Lewis et al. | |
| 6,233,577 B1 | 5/2001 | Ramasubramani et al. | |
| 6,237,033 B1 | 5/2001 | Doeberl et al. | |
| 6,396,926 B1 | 5/2002 | Takagi et al. | |
| 6,397,330 B1 | 5/2002 | Elgamal et al. | |
| 6,477,646 B1 | 11/2002 | Krishna et al. | |
| 6,502,135 B1 | 12/2002 | Munger et al. | |
| 6,578,061 B1 | 6/2003 | Aoki et al. | |
| 6,584,567 B1 * | 6/2003 | Bellwood et al. | 713/171 |
| 6,587,866 B1 | 7/2003 | Modi et al. | |
| 6,598,167 B1 | 7/2003 | Devine et al. | |
| 6,615,276 B1 | 9/2003 | Mastrianni et al. | |
| 6,621,505 B1 | 9/2003 | Beauchamp et al. | |
| 6,678,733 B1 | 1/2004 | Brown et al. | |
| 6,681,327 B1 | 1/2004 | Jardin | |
| 6,751,677 B1 | 6/2004 | Ilnicki et al. | |
| 6,757,823 B1 | 6/2004 | Rao et al. | |
| 6,763,459 B1 | 7/2004 | Corella | |
| 6,785,810 B1 | 8/2004 | Lirov et al. | |
| 6,874,089 B1 | 3/2005 | Dick et al. | |
| 6,886,095 B1 | 4/2005 | Hind et al. | |
| 6,941,459 B1 | 9/2005 | Hind et al. | |
| 6,963,980 B1 | 11/2005 | Mattsson | |
| 6,990,660 B1 | 1/2006 | Moshir et al. | |
| 2002/0012473 A1 | 1/2002 | Kondo et al. | |
| 2002/0015497 A1 * | 2/2002 | Maruyama et al. | 380/277 |
| 2002/0016911 A1 | 2/2002 | Chawla et al. | |
| 2002/0039420 A1 | 4/2002 | Schacham et al. | |
| 2002/0066038 A1 | 5/2002 | Mattsson | |
| 2002/0073232 A1 | 6/2002 | Hong et al. | |
| 2002/0087884 A1 | 7/2002 | Shacham et al. | |
| 2002/0112167 A1 | 8/2002 | Boheh et al. | |
| 2003/0014650 A1 | 1/2003 | Freed et al. | |
| 2003/0065919 A1 | 4/2003 | Albert et al. | |
| 2003/0097428 A1 | 5/2003 | Afkhami | |
| 2003/0101355 A1 | 5/2003 | Mattsson | |
| 2003/0123671 A1 | 7/2003 | He et al. | |
| 2003/0156719 A1 | 8/2003 | Cronce | |
| 2003/0197733 A1 | 10/2003 | Beauchamp | |
| 2003/0204513 A1 | 10/2003 | Bumbulis | |
| 2004/0015725 A1 | 1/2004 | Boneh et al. | |

FOREIGN PATENT DOCUMENTS

| | | | |
|---|---|---|---|
| WO | WO01/03398 A2 * | 1/2001 | |
| WO | WO0103398 A2 * | 1/2001 | |
| WO | WO 02/101605 | 12/2002 | |

OTHER PUBLICATIONS

Netscape Proxy Server Administrator's Guide. Feb. 25, 1998. Netscape. V3.5 for Unix. Chapter 7 and 9.*

Netscape; "Netscape Proxy Server Administrator's Guide, Version 3.5 for Unix"; Feb. 25, 1998; Retrieved from the internet.

Oppliger, R.; "Authorization Methods for E-Commerce Applications"; 1999.

U.S. Appl. No. 10/526,252, filed Feb. 24, 2005, Fountain et al.
U.S. Appl. No. 10/850,827, filed May 20, 2004, Koyfman.
U.S. Appl. No. 11/236,046, filed Sep. 26, 2005, Metzger et al.
U.S. Appl. No. 11/236,294, filed Sep. 26, 2005, Metzger et al.
U.S. Appl. No. 11/236,061, filed Sep. 26, 2005, Metzger et al.

Alteon Web Systems: "The Next Step in Server Loading Balancing" Nov. 1999, Retrieved from the Internet: URL:http:/www.nortelnetworks.com/products/library/collateral/intel_int/webworking_wp.pdf, Retrieved on Mar. 2, 2004; pp. 4-11.

Alteon web Systems: "Networking with the Web in Mind" May 1999, Retrieved from the Internet: URL:http://www.nortelnetworks.com/products/library/collateral/intel_int/webworking_wp.pdf, Retrieved on Mar. 2, 2004; p. 1, pp. 3-7.

Boneh, D., "Twenty Years of Attacks on the RSA Cyrptosystem," Notices of the AMS, vol. 46, No. 2, pp. 203-213, 1999.

Boneh, et al., "An Attack on RSA Given a Small Fraction of the Private Key Bits," ASIACRYPT '98, LNCS 1514, pp. 25-34, 1998.

Boneh, et al., "Cryptanalysis of RSA with Private Key $d$ Less than $N^{0.292}$," (extended abstract), 1999.

Boneh, et al., "Efficient Generation of Shared RSA Keys," (extended abstract).

Durfee, G., et al., "Cryptanalysis of the RSA Schemes with Short Secret Exponent from Asiacrypt '99," ASIACRYPT 2000, LNCS 1976, pp. 14-29, 2000.

Fiat, A. "Batch RSA, (digital signatures and public key kryptosystems)" Advances in Crytology—Cryto '89 Proceedings Aug. 20-24, 1989, Springer-Verlag.

Großschädl, J., et al., "The Chinese Remainder Theorem and its Application in a High-Speed RSA Crypto Chip," 2000.

Herda, S., "Non-repudiation: Constituting evidence and proof in digital cooperation," Computer Standards and Interfaces, Elsevier Sequoia, Lausanne, CH, 17:1 (69-79) 1995.

Immerman, N., "Homework 4 with Extensive Hints," 2000.

Menezes, A., et al., "Handbook of Applied Cryptography," 1996 CRC Press, pp. §8.2-8.3 and §14.5.

RSA Laboratories: "PKCS #7: Cryptographic Message Syntax Standard, Version 1.5," RSA Laboratories Technical Note, pp. 1-30, Nov. 1, 1993.

RSA "PKCS #1 v2.0 Amendment 1: Multi-Prime RSA," 2000.

Schacham, H., et al., "Improving SSL Handsake Performance via Batching," Topics in Cryptology, pp. 28-43, 2001.

Shand, M., et al., "Fast Implementations of RSA Cryptography," 1993.

Sherif, M.H., et al., "SET and SSL: Electronic Payments on the Internet," IEEE, pp. 353-358 (1998).

Stallings, W., "IP Security," Network Security Essentials, Applications and Standards, Chapters 6 and 7, pp. 162-223, 2000.

Takagi, T., "Fast RSA-Type Cryptosystem Modulo $p^kq$," 1998.

Takagi, T., "Fast RSA-Type Cryptosystems Using N-Adic Expansion," Advances in Technology—CRYPTO '97, LNCS 1294, pp. 372-384, 1997.

Wiener, M., "Cryptanalysis of Short RSA Secret Exponents," 1989.

"Security Protocols Overview (An RSA Data Security Brief)", RSA Data Security, 1999, http://www.directoryservice.com/WP/RSA/protocols.pdf, pp. 1-4.

* cited by examiner

METHOD AND SYSTEM FOR CACHING SECURE WEB CONTENT

RELATED APPLICATIONS

This application claims the benefit of U.S. Provisional Application No. 60/223,171 filed on Aug. 7, 2000, which is incorporated herein by reference.

FIELD OF THE INVENTION

The field of the invention is secure content in a network system. More particularly the invention is in the field of secure content transfer in a network using caching techniques.

BACKGROUND OF THE INVENTION

Web caches are network applications used to reduce network traffic and improve response times. Web caches work by storing static content on a network at intermediate locations. Static content encompasses items that rarely change. Once stored the information is available for repeated transmissions of the same content over an abbreviated portion of the network. By eliminating the need for the server to produce all of the requested information for each request, the effective bandwidth of the network is increased. Unfortunately, web caching does not currently apply to secure web content. Secure web content is sent encrypted using various protocols such as Transport Layer Security ("TLS") or Secure Socket Layer ("SSL"). Such secure protocols use unique encryption keys known only to the connection endpoints. Each message therefore is independently secure. Consequently, intermediate web caches in a computer network do not store and retransmit secure static content since they cannot examine it to determine if it has changed. As far as the cache is concerned each message is unique effectively eliminating the purpose of a cache entirely. Hence, TLS and SSL are incompatible with the existing web caching architecture.

Transport Layer Security protocol is one of the most widely deployed protocols for securing communications on the World Wide Web ("WWW") and is used by most E-commerce and financial web sites. It guarantees privacy and authenticity of information exchanged between a web server and a web browser. Currently, the number of web sites using TLS or SSL to secure web traffic is growing at a phenomenal rate. As the services provided by the World Wide Web continue to expand, so will the need for security. Unfortunately, TLS and SSL are incompatible with the current network design methodologies used in the Internet.

This incompatibility stems from the inherent nature of how a secure session is established. A TLS session, for example, between a web server and a web browser occurs in a number of phases. When a web browser first connects to a web server using TLS, the browser and server execute the TLS handshake protocol. The outcome of this protocol is a session encryption key and a session integrity key. These keys are known only to the web server and the web browser.

Once the session keys are established, the browser and server begin exchanging data. The data is encrypted using the session encryption key and protected from tampering using the session integrity key. When the browser and server are done exchanging data the connection between them is closed. If the browser and server subsequently reestablish a secure connection the browser and server may execute a resume handshake or establish a new set of session keys. A resume handshake protocol causes both server and browser to reuse the session key previously established during the initial handshake, and is more efficient, but requires the connection between the web server and web browser to be continuous. Thereafter, all application data is encrypted and protected using the previously established session keys.

Web caches are typically located on the network between the user and the web server being accessed. The web cache inspects all responses coming back from the server and stores in its memory all content that changes infrequently. This information is called static content. Examples of static content include the banner and the navigation buttons on the page. The next time a user requests this information the cache responds immediately with the information without contacting the web server. As a result, web caches dramatically reduce traffic on the network and reduce the response times to user requests.

A reverse proxy is similar to a web cache. The difference lies in where the reverse proxy is located and the type of content cached. While web caches are located close to the client processor so as to minimize response time, the reverse proxy is typically located close to the web server with the most common location being at the same site as the web server. The main goal of the reverse proxy is to reduce the load on the web server. Any time a request is received at the web site the reverse proxy first determines whether the response is already cached. If so, the reverse proxy responds itself without contacting the web server. Otherwise the request is sent to the web server. Inherent to the reverse proxy function is its ability to examine the request as well as the content of the cache to determine if the information stored fulfills the request.

Web caches and reverse proxies are ineffective when dealing with secure content. The problem lies in identification of repeated information. Secure content passing through these appliances is encrypted using a key known only to the end points, namely the web server and the web browser. Each web browser connected to the proxy passes through information that is unrecognizable to the cache. The web cache or the reverse proxy cannot interpret the data to determine if the data should be stored or if the data request matches any stored data. Hence it is useless to cache the encrypted information. Consequently, the existing infrastructure designed to make the Internet more efficient and faster becomes ineffective when dealing with secure content.

SUMMARY OF THE INVENTION

A method and system are provided for caching secure content on a computer network. One embodiment establishes a reverse proxy logically located between a web server and connections to the outside world that is capable of interpreting and storing secure content.

The Secure Reverse Proxy ("SRP") in one embodiment intercepts request for secure content prior to the demand being received by the web server. The SRP establishes an encrypted session with the web browser to facilitate the SRP's ability to examine the secure content. Once the secure request is decrypted, the SRP examines its cache and determines if the requested content available. If the requested content is available, the SRP encrypts it using the established session keys with the web browser and transmits the information. In this embodiment the web browser never directly contacts the web server nor does the web server need to respond to the request.

In an additional embodiment the SRP determines if the requested information is not available in the SRP's cache.

Upon determining that the information is not cached, the SRP establishes a secure connection with the web server using TLS, SSL or other secure protocol. The SRP forwards the web browser's request for information to the web server and the web server responds to the SRP as if it was the web browser. Upon receiving the information the SRP stores it in the cache for future use in either encrypted or clear-text form. With the information requested by the browser now available in the SRP's cache, the SRP retrieves the information and encrypts it using the session keys established between the SRP and the web browser. The SRP then transmits the information to the web browser. Since the requested information is now contained in the SRP's cache, subsequent requests from this or other browsers for the same information will not require any interaction with the web server. Thus the efficiency of the network is increased and the load upon the server is diminished.

BRIEF DESCRIPTION OF THE FIGURES

The present invention is illustrated by way of example in the following diagrams and flow charts in which like references indicate similar elements. The following diagrams and flow charts disclose various embodiments of the present invention for purposes of illustration only and are not intended to limit the scope of the invention.

DETAILED DESCRIPTION

Figure 1:
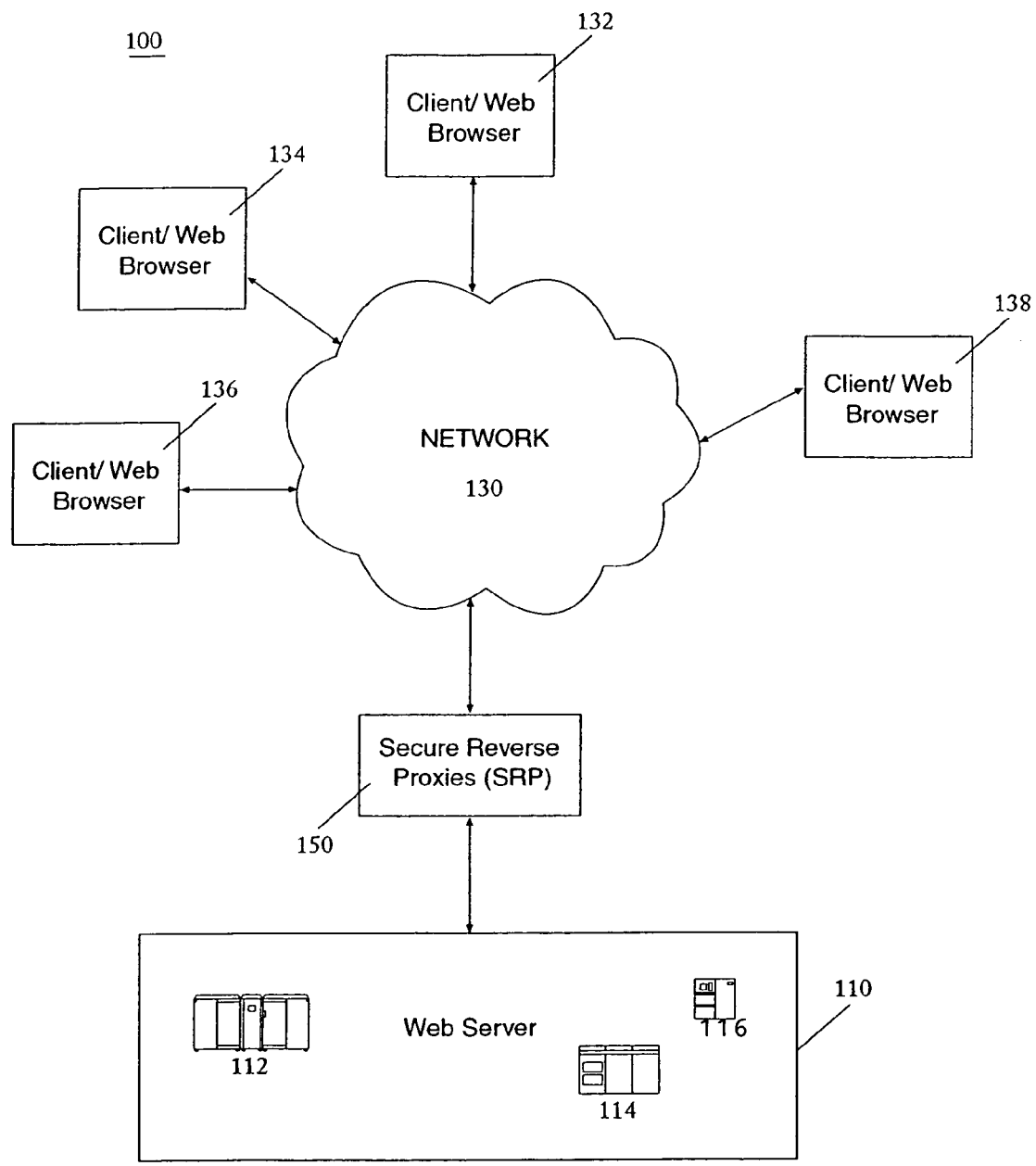
FIG. 1 is a block diagram of an embodiment of a network system for improving secure communications.

A method and system are provided for secure reverse proxies capable of caching secure content. These Secure Reverse Proxies ("SRP") are, in one embodiment, installed logically between the web server and the connection to the outside world with all incoming secure requests being first sent to the SRP rather than directly to the server.

Normally, a request to establish a secure connection is received by the server from a web browser. In one embodiment the request message, such as a request to establish a TLS session, is referred to as a client hello and is directed to the SRP instead of the server. The SRP responds to the request by sending back a TLS server hello message containing the server certificate. After performing the TLS key exchange protocol the SRP and the requesting browser share a secret encryption key and a secret integrity key. These keys are used to protect the rest of the session and are appropriately called session keys.

With a TLS session established between the SRP and the web browser the requesting web browser sends an encrypted HTTP request using the TLS protocol and the session keys. The SRP receives the request, decrypts it using the session keys and checks whether the local cache contains an appropriate response to the incoming inquiry. If the SRP contains the requested information, the SRP encrypts the response using the current session keys and sends the result to the requesting web browser. Up to this point the web server has never seen the request.

If the request received by the SRP is not contained in the local cache the SRP must forward the request to the web server. This requires the SRP and the web server to establish a secure session, independent of the secure session between the SRP and the web browser. The request to the web server is thereafter secured using a secure protocol such as TLS so that is does not appear as clear-text on the network. In another embodiment all communication between the SRP and the web server takes place over a private network at the web site or by an inherently secure connection such as fiber optic or copper cable. If such a connection between the server and the SRP is present it is possible for the SRP to send the request to the web server using clear-text HTTP. This reduces the load on the web server since the web server need not perform any expensive secure handshake computations.

With communication between the web server and the SRP established either through a secure network protocol or an inherently secure connection, the web server sends a response to the query back to the SRP. Having received a response from the web server, the SRP caches the information in either cipher or clear-text format. Now possessing the requested information in the local cache, the SRP encrypts the requested information using the current SRP/browser session keys and sends the result to the requesting web browser. While the SRP can maintain numerous secure connections with a number of web browsers using a number of session keys, the SRP need only maintain one secure connection with the server. Thus the load on the server is dramatically reduced and the efficiency of the network is significantly improved.

In one embodiment the SRP stores the cached information locally within the server or on a non-volatile medium such as magnetic tape, optical disks, by a third party, or using other techniques known in the art. To ensure the information remains secure, information is stored on non-volatile mediums encrypted under a separate key known only to the server. The server maintains the key to the information using a tamper resistant non-volatile card.

FIG. 1 shows one embodiment for enhancing secure network communications. The system 100 includes multiple client computers 132, 134, 136, and 138, which are coupled to a server system 110 through a network 130. The network 130 can be any network, such as a local area network, a wide area network, or the Internet. Coupled among the server system 110 and the network 130 is a Secure Reverse Proxy 150. While shown as a separate entity, the SRP 150 can be located independently of the server system, the network environment or distributed among any number of server sites 112, 114 and 116. The client computers each include one or more processors and one or more storage devices. Each of the client computers also includes a display device, and one or more input devices. The SRP can be one or more devices, each including one or more processors and storage devices.

All of the storage devices store various data and software programs. In one embodiment, the method for improving TLS is carried out on the system 100 by software instructions executing on one or more of the server sites 112, 114 and 116. The software instructions may be stored on the server system 110 any one of the server sites 112–116 on any one of the client computers 132–138 or any number of SRPs. For example, one embodiment presents a hosted application where an enterprise requires secure communications with the server. The software instructions to enable the communication to be cached by the SRP are stored on the server. In other embodiments, the software instructions and the caching process may be stored and executed on the client computers. Data required for the execution of the software instructions can also be accessed via the network and can be stored anywhere on the network.

Figure 2:
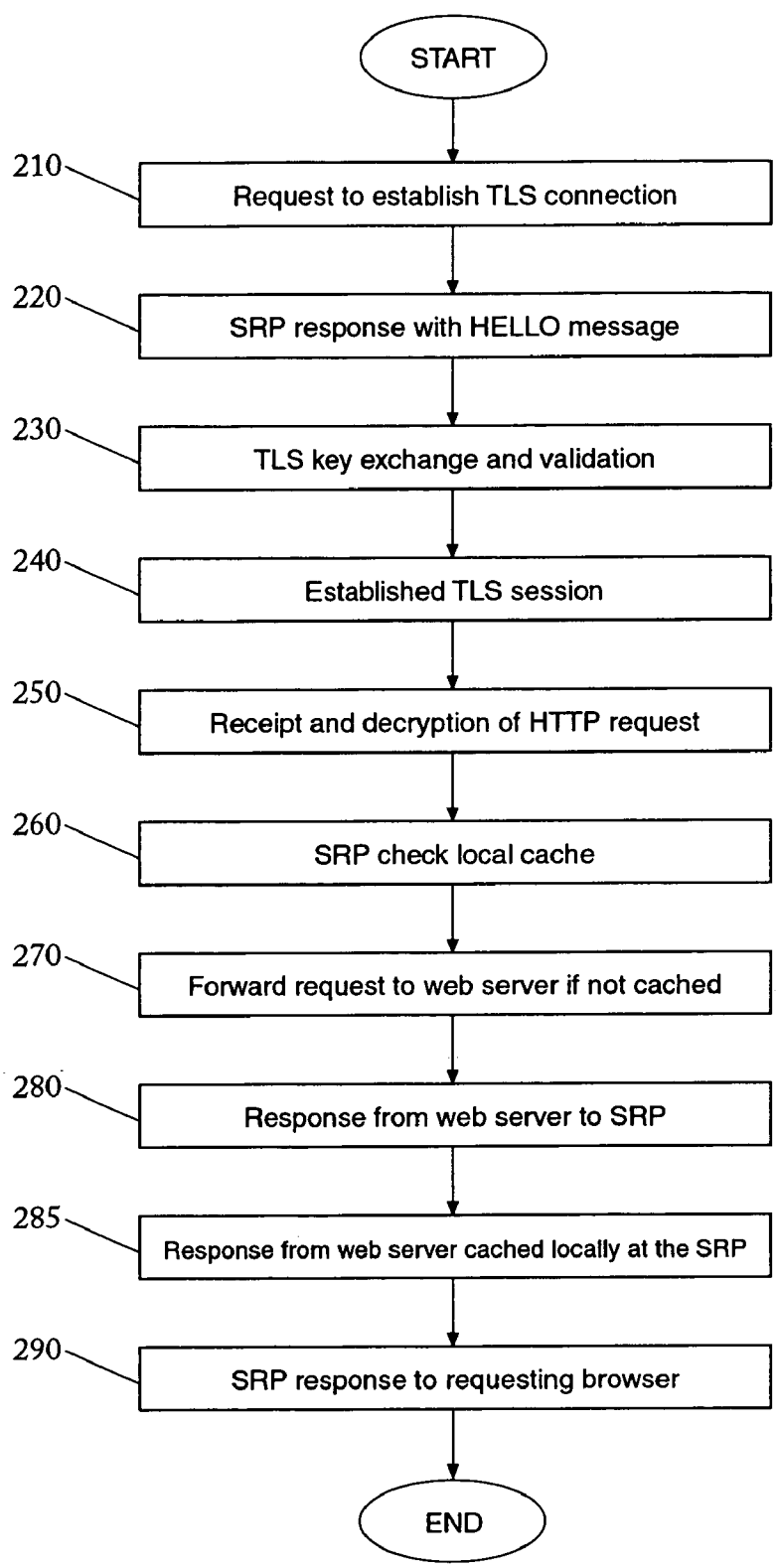
FIG. 2 is a flow diagram illustrating a method for secure reverse proxy caching of secure content for one embodiment of the present invention.

FIG. 2 is a flow diagram for enhancing secure content on a network using reverse proxies of an embodiment. The process begins with a request by the web browser to establish a secure connection 210. The SRP responds with a hello message 220 and a TLS key is exchanged and validated between the browser and the SRP 230. With the establishment of the secure session 240 the SRP receives an HTTP request 250. The SRP examines the local cache 260 and if the content is not cached, forwards the request to the web server 270. This forwarding is through an independent TLS session established between the SRP and the web server. The web server responds with the secure content 280 which is locally cached at the SRP 285 and then forwarded to the web browser 290 via the earlier established session keys.

While TLS and other secure network protocols typically prevent the intermediate storing of secure static content on a reverse proxy, the architecture described herein enables such content to be cached. Hence, the web browser continues to receive encrypted content yet requests for encrypted material at the server are significantly reduced. The secure protocol between the SRP and the web browser preserves the confidentiality of the communication, as does the connection between the SRP and the web server. This connection provides no clear-text traffic from which an eavesdropper or active attacker can gain information. In addition to this security benefit there is also a significant performance advantage since the web server responds to minimal browser requests.

Performance is also enhanced by reducing the costly protocol of establishing a secure connection. When an SRP is not used, the web server must perform an initial TLS or equivalent handshake with every new user that connects to the site. The TLS handshake is expensive and slows down the network. In one embodiment, the web server sees only connections from the SRP as the need to establish multiple TLS connections is displaced to the SRP. Having once established a secure connection, the SRP and the server can utilize a more efficient resume handshake rather than having to reinitiate the creation of a unique session key. Consequently, the need to perform and handle TLS handshakes repetitively is eliminated and only one TLS handshake with the SRP need be accomplished. The resulting reduced load on the sever increases effective network bandwidth and reduces cost.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics.

What is claimed is:

1. A method for caching secure content in a Secure Reverse Proxy ("SRP") in a secure network, comprising:
    coupling at least one SRP among at least one web browser and at least one web server wherein the at least one SRP receives from the at least one web browser requests for establishing a first secure session;
    establishing the first secure session using a first secure session protocol between the at least one SRP and the at least one web browser, wherein the at least one web browser sends an encrypted request for content to the at least one SRP;
    decrypting the encrypted request for content from the at least one web browser at the at least one SRP using the first secure session protocol, wherein the at least one SRP determines that the at least one SRP does not possess the requested content;
    establishing a second secure session using a second secure session protocol between the at least one SRP and the at least one web server, wherein the second secure session is maintained;
    encrypting the request for content from the at least one web browser using the second secure session protocol;
    sending the encrypted request for content to the at least one web server using the second secure session;
    receiving the requested content from the at least one web server at the at least one SRP using the second secure session;
    decrypting the requested content using the second secure session protocol;
    encrypting the reauested content using the first secure session protocol for sending, using the first secure session, to the at least one web browser from the at least one SRP in response to the encrypted request for content from the at least one web browser;
    determining at the at least one SRP if the requested content is a static content;
    encrypting the requested content, if the requested content is the static content, using a third secure session protocol for storing the encrypted requested content locally in a memory at the at least one SRP, wherein the third secure session protocol is known only to the at least one SRP;
    decrypting the encrypted static content from the memory at the at least one SRP upon subsequent requests for the static content; and
    sending the static content to the at least one web browser.

2. The method of claim 1, wherein storing includes using non-volatile media.

3. The method of claim 1, wherein coupling includes establishing a dedicated secure line between the SRP and the web server.

4. The method of claim 1, wherein coupling includes collocating the web server and the SRP.

5. The method of claim 1, wherein content includes an HTTP page.

6. The method of claim 1, wherein the first secure session includes Transport Layer Security protocol.

7. The method of claim 1, wherein the second secure session includes Transport Layer Security protocol.

8. The method of claim 1, wherein the first secure session includes Secure Socket Layer protocol.

9. The method of claim 1, wherein the second secure session includes Secure Socket Layer protocol.

10. The method of claim 1, wherein the first secure session includes Internet Protocol Secure ("IPSec") techniques.

11. The method of claim 1, wherein the second secure session includes Internet Protocol Secure ("IPSec") techniques.

12. The method of claim 1, wherein the static content is a banner or a navigation button.

13. The method of claim 5, further comprising, before storing the HTTP page, encrypting the HTTP page.

14. A method for caching secure content over a network comprising:
    establishing a first secure session between a client and a proxy server using a first secure session protocol;
    encrypting a request for content at the client using the first secure session protocol;
    sending the encrypted request for content from the client to the proxy server using the first secure session;
    receiving the encrypted request for content at the proxy server using the first secure session;

decrypting the encrypted request for content at the proxy server using the first secure session protocol;
determining that the content is not available at the proxy server;
establishing a second secure session between the proxy server and a web server using a second secure session protocol;
encrypting the request for content using the second secure session protocol at the proxy server;
sending the encrypted request for content from the proxy server to the web server using the second secure session;
receiving the encrypted request for content at the web server using the second secure session;
decrypting the encrypted request for content at the web server using the second secure session protocol;
encrypting the content at the web server using the second secure session protocol;
sending the encrypted content from the web server to the proxy server using the second secure session;
receiving the encrypted content at the proxy server using the second secure session;
decrypting the encrypted content at the proxy server using the second secure session protocol;
determining if the content is a static content at the proxy server;
encrypting the content, if the content is the static content, using a third secure session protocol at the proxy server for storing the static content locally in a memory at the proxy server, wherein the third secure session protocol is known only to the proxy server;
encrypting the content at the proxy server using the first secure session protocol;
sending the encrypted content from the proxy server to the client using the first secure session;
receiving the encrypted content at the client using the first secure session;
decrypting the encrypted content at the client using the first secure session protocol; and
decrypting the encrypted static content at the proxy server using the third secure session protocol when an additional request for the static content is sent from the client to the proxy server.

15. The method of claim 14, wherein a plurality of clients are each securely connected to the proxy server via a plurality of differing secure session protocols and the proxy server is securely connected to the web server via the second secure session protocol in order to retrieve secure content requested by the plurality of clients that is not contained at the proxy server.

16. The method of claim 14, wherein the static content is a banner or a navigation button.

17. A method for caching secure content over a network comprising:
establishing a first secure session between a client and a proxy server using a first secure session protocol;
sending an encrypted request for content from the client to the proxy server using the first secure session;
receiving the encrypted request for content at the proxy server using the first secure session;
decrypting the encrypted request for content at the proxy server using the first secure session protocol;
determining that a first part of the content is available at the proxy server and a second part is not available at the proxy server;
establishing a second secure session between the proxy server and a web server using a second secure session protocol to retrieve the second part of the content;
encrypting a second request for the second part of the content using the second secure session protocol at the proxy server;
sending the encrypted second request for the second part of the content from the proxy server to the web server using the second secure session;
receiving the encrypted second request for the second part of the content at the web server using the second secure session;
decrypting the encrypted second request for the second part of the content at the web server using the second secure session protocol;
encrypting the second part of the content at the web server using the second secure session protocol;
sending the encrypted second part of the content from the web server to the proxy server using the second secure session;
receiving the encrypted second part of the content at the proxy server using the second secure session;
decrypting the encrypted second part of the content at the proxy server using the second secure session protocol;
determining if the second part of the content is a static content at the proxy server;
encrypting the second part of the content, if the second part of the content is the static content, using a third secure session protocol at the proxy server for storing the static content locally in a memory at the proxy server, wherein the third secure session protocol is known only to proxy server;
decrypting the first part of the content at the proxy server using the third session protocol;
encrypting the first and second parts of the content at the proxy server using the first secure session protocol;
sending the encrypted first and second parts of the content from the proxy server to the client using the first secure session;
receiving the encrypted first and second parts of the content at the client using the first secure session;
decrypting the encrypted second and first parts of the content at the client using the first secure session protocol; and
decrypting the first and second parts of the content at the proxy server using the third secure session protocol when an additional request for the first and the seconds parts of the content is sent from the client to the proxy server.

18. The method of claim 17, wherein a plurality of clients are each securely connected to the proxy server via a plurality of differing secure session protocols and the proxy server is securely connected to the web server via the second secure session protocol in order to retrieve secure content requested by the plurality of clients that is not contained at the proxy server.

19. The method of claim 17, wherein the static content is a banner or a navigation button.

20. A method comprising:
establishing a first secure session between a client and a secure reverse proxy (SRP), wherein the first secure session prevents intermediate storing between the client and the SRP of secure static content on a reverse proxy;
receiving a request for content from the client at the SRP, wherein the requested content is uncached at the SRP;

establishing a second secure session between the SRP and a web server, wherein the second secure session prevents intermediate storing between the SRP and the web server of secure static content on a reverse proxy;

in response to the request for content:
- obtaining, by way of the second secure session, secure static content from the web server at the SRP;
- caching the secure static content at the SRP;
- sending, by way of the first secure session, the secure static content from the SRP to the client.

21. The method of claim 20, wherein said caching the secure static content results in a reduced number of requests at the web server for encrypted content.

22. The method of claim 20, wherein the first secure session is a TLS session.

23. The method of claim 20, wherein the second secure session is a TLS session.

* * * * *